US006383668B1

(12) United States Patent
Fullerton et al.

(10) Patent No.: US 6,383,668 B1
(45) Date of Patent: May 7, 2002

(54) MAGNETIC RECORDING MEDIA WITH ANTIFERROMAGNETICALLY COUPLED HOST LAYER FOR THE MAGNETIC RECORDING LAYER

(75) Inventors: Eric Edward Fullerton, Morgan Hill; David Thomas Margulies, Gilroy; Ernesto Esteban Marinero, Saratoga; Manfred Ernst Schabes, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/536,868

(22) Filed: Mar. 27, 2000

(51) Int. Cl.[7] .............................. G11B 5/66; G11B 5/70; B32B 3/02
(52) U.S. Cl. ........................ 428/694 TM; 428/694 TS; 428/900; 428/65.3; 428/65.5
(58) Field of Search ...................... 428/694 TM, 900, 428/694 TS, 65.3, 65.5

(56) References Cited

U.S. PATENT DOCUMENTS 5,569,533 A * 10/1996 Lal et al. .................... 428/332
5,815,342 A * 9/1998 Akiyama et al. ......... 360/97.01
6,294,490 B1 * 9/2001 Zou et al. ...................... 501/9

OTHER PUBLICATIONS

Parkin et al., "Oscillations in Exchange Coupling and Magnetoresistance in Metallic Superlattice Structures: Co/Ru, Co/Cr, and Fe/Cr", Phys. Rev. Lett., vol. 64, No. 19, May 1990, p. 2304–2307.*

* cited by examiner

Primary Examiner—Paul Thibodeau
Assistant Examiner—Holly C. Rickman
(74) Attorney, Agent, or Firm—Thomas R. Berthold

(57) ABSTRACT

A magnetic recording disk has a magnetic recording layer formed on a special multilayered "host" layer. The host layer is a "synthetic antiferromagnetically", i.e., at least two ferromagnetic films that are exchange-coupled antiferromagnetically (AF) to one another across a nonferromagnetic spacer film so that their magnetic moments are oriented antiparallel. The magnetic recording layer has a different composition from the top ferromagnetic film in the host layer and is ferromagnetically coupled to the top ferromagnetic film of the host layer. The magnetic volume V of the composite structure (magnetic recording layer and host layer) that determines the thermal stability will be approximately the sum of the volumes of the grains in the magnetic recording layer and the AF-coupled ferromagnetic films of the host layer. However, the magnetic moment of the composite structure is primarily just the moment from the magnetic recording layer because the host layer is designed to have essentially no net magnetic moment.

5 Claims, 2 Drawing Sheets

MAGNETIC RECORDING MEDIA WITH ANTIFERROMAGNETICALLY COUPLED HOST LAYER FOR THE MAGNETIC RECORDING LAYER

TECHNICAL FIELD

This invention relates generally to magnetic recording media, and more particularly to thermally stable high density media.

BACKGROUND OF THE INVENTION

Conventional magnetic recording media, such as the magnetic recording disks in hard disk drives, typically use a granular ferromagnetic layer, such as a sputter-deposited cobalt-platinum (CoPt) alloy, as the recording medium. Each magnetized domain in the magnetic recording layer is comprised of many small magnetic grains. The transitions between magnetized domains represent the "bits" of the recorded data. IBM's U.S. Pat. Nos. 4,789,598 and 5,523,173 describe this type of conventional rigid disk.

As the storage density of magnetic recording disks has increased, the product of the remanent magnetization Mr (the magnetic moment per unit volume of ferromagnetic material) and the magnetic layer thickness t has decreased. Similarly, the coercive field or coercivity ($H_c$) of the magnetic layer has increased. This has led to a decrease in the ratio $Mrt/H_c$. To achieve the reduction in Mrt, the thickness t of the magnetic layer can be reduced, but only to a limit because the magnetization in the layer will become more susceptible to thermal decay. This decay has been attributed to thermal activation of small magnetic grains (the superparamagnetic effect). The thermal stability of a magnetic grain is to a large extent determined by $K_u V$, where $K_u$ is the magnetic anisotropy constant of the magnetic layer and V is the volume of the magnetic grain. As the magnetic layer thickness is decreased, V decreases. Thus, if the magnetic layer thickness is too thin, the stored magnetic information will no longer be stable at normal disk drive operating conditions.

One approach to the solution of this problem is to move to a higher anisotropy material (higher $K_u$). However, the increase in $K_u$ is limited by the point where the coercivity $H_c$, which is approximately equal to $K_u/Mr$, becomes too large to be written by a conventional recording head. A similar approach is to reduce the Mr of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (SNR) of the magnetic layer.

IBM's co-pending application Ser. No. 09/416,364, filed Oct. 8, 1999, now U.S. Pat. No. 6,280,813, addresses the thermal stability problem by replacing the conventional single magnetic recording layer with two ferromagnetic films that are antiferromagnetically coupled together across a nonferromagnetic spacer film. Because the magnetic moments of the two antiferromagnetically-coupled films are oriented anti parallel, the net remanent magnetization-thickness product (Mrt) of this recording layer is the difference in the Mrt values of the two ferromagnetic films. However, this reduction in Mrt is accomplished without a reduction in the thermal stability (represented by $K_u V$) of the recording layer because the volume V of the grains in each of the two separate antiferromagnetically-coupled films add constructively. While this approach appears promising, it introduces a new set of unknowns relating to the magnetic and recording/reproducing properties of this unconventional recording layer.

What is needed is magnetic recording media that will support very high density recording while retaining good thermal stability, yet takes advantage of the well-known magnetic and recording/reproducing properties of the conventional single layer granular Co alloy magnetic material.

SUMMARY OF THE INVENTION

The invention is a magnetic recording disk wherein the magnetic recording layer is formed on a special multilayered "host" layer. The host layer is a "synthetic antiferromagnet", i.e., at least two ferromagnetic films that are exchange-coupled antiferromagnetically (AF) to one another across a nonferromagnetic spacer film so that their magnetic moments are oriented anti parallel.

In the preferred embodiment, the thicknesses and materials of the two ferromagnetic films are chosen so that the moments from the individual ferromagnetic films essentially cancel. Thus the host layer has no net magnetic moment, or a very small nonzero moment, so that it does not contribute to the Mrt of the magnetic recording layer.

The magnetic recording layer has a different composition from the top ferromagnetic film in the host layer and is ferromagnetically coupled to the top ferromagnetic film of the host layer. The magnetic volume V of the composite structure (magnetic recording layer and host layer) that determines the thermal stability will be approximately the sum of the volumes of the grains in the magnetic recording layer and the AF-coupled ferromagnetic films of the host layer. However, the magnetic moment of the composite structure is just the moment from the magnetic recording layer because the host layer is designed to have essentially no net magnetic moment. Thus the antiferromagnetic coupling between the two ferromagnetic films of the host layer provides a mechanism to increase the effective thickness of the composite structure without increasing the net Mrt value of the composite structure.

In an alternative embodiment the two AF-coupled films of the host layer have magnetic moments that are still oriented anti parallel but are deliberately different in magnitude so that the host layer has a net magnetic moment. This may be done to optimize recording performance, reduce thermal decay or design the media to certain values of magnetic moment and coercivity without changing the manufacturing process.

For a fuller understanding of the nature and advantages of the present invention, reference should be made to the following detailed description taken together with the accompanying figures.

DETAILED DESCRIPTION OF THE INVENTION

Prior Art

Figure 1:
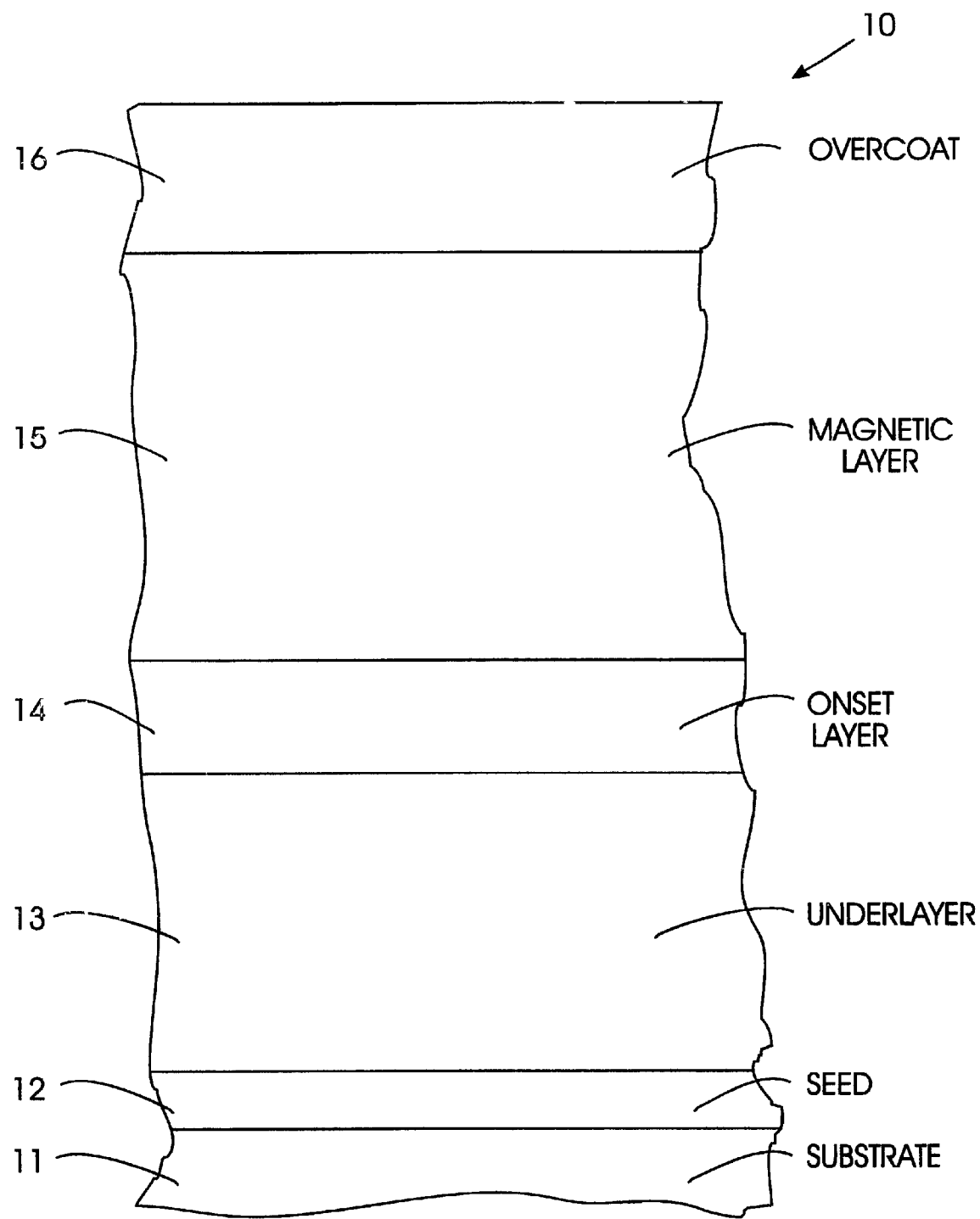
FIG. 1 is a schematic sectional view of a prior art magnetic recording disk with a single-layer magnetic recording layer.

FIG. 1 illustrates the cross sectional layer structure of a prior art disk 10 with a single layer Co alloy magnetic recording layer 15. The thin film layers are sputter deposited onto at least one and preferably both planar surfaces of the substrate 11 to form the data recording areas of the disk. The disk substrate 11 may be made or any suitable material, such glass, SiC/Si, ceramic, quartz, or an AlMg alloy base with a NiP surface coating. The seed layer 12 is an optional layer that may be used to improve the growth of the underlayer 13 and thus the magnetic properties of the magnetic layer 14, such as its coercivity. The seed layer 12 is most commonly used when the substrate 11 is nonmetallic, such as glass. The seed layer 12 has a thickness in the range of approximately 5 to 50 nm and is one of the materials, such as Ta, CrTi or NiAl, which are known in the prior art to be useful as seed materials for promoting the growth of subsequently deposited layers in certain preferred crystalline orientations. The underlayer 13 is deposited onto the seed layer, if present, or otherwise directly onto the substrate 11, and is a nonmagnetic material such as chromium or a chromium alloy, such as CrV or CrTi. Variations in the thickness of the underlayer 13 result in changes in the magnetic characteristics of the magnetic layer 15, such as its coercivity. The underlayer 13 has a thickness in the range of 1 to 100 nm with a typical value being approximately 20 nm.

Before the deposition of the magnetic layer 15, a very thin (typically 0.5 to 5 nm) Co alloy onset or nucleation layer 14 is typically deposited on the underlayer 13. The nucleation layer 14 has a composition selected to enhance the growth of the hexagonal close-packed (HCP) Co alloy magnetic layer 15 so that its C-axis is oriented in the plane of the layer. The nucleation layer 14 may be a CoCr alloy with a Cr composition selected so as to make the layer 14 nonferromagnetic or very slightly ferromagnetic. Alternatively, the nucleation layer 14 may be a ferromagnetic Co alloy, in which case the nucleation layer 14 will affect the magnetic properties of the magnetic layer 15. The Co alloy magnetic recording layer 15 may be a CoPtCrB alloy with 4 to 25 atomic percent (at. %) platinum, 10 to 23 at. % chromium and 2 to 20 at. % boron. If the magnetic layer 15 is CoPtCrB, then the nucleation layer 14 may be CoPtCr or CoPtCrB with B less than 6 at. %. The magnetic layer 15 typically has a thickness in the range of 5 to 20 nm.

The protective overcoat 16 may be a typical overcoat of essentially amorphous carbon optionally doped with hydrogen and/or nitrogen. The overcoat is typically less than 15 nm thick. All of the layers described above from the seed layer 12 to the overcoat 16 can be sputtered in a continuous process in either an in-line sputtering system or a single disk system, such as commercially available single disk systems with multiple sputtering target capacity. The sputter deposition of each of the layers can be accomplished using standard targets and techniques known to those in the field with the modifications described above.

Preferred Embodiments

The magnetic recording medium of the present invention has a magnetic recording layer formed on a special multi-layered host layer. The host layer comprises at least two ferromagnetic films that are exchange-coupled antiferromagnetically (AF) to one another across a nonferromagnetic spacer film.

In the preferred embodiment the two AF-coupled films of the host layer have magnetic moments that are substantially equal in magnitude but are oriented anti parallel so that the host layer has substantially no net magnetic moment. However, the host layer may have some nonzero net magnetic moment because of the difficulty in fabricating the films to precise thicknesses.

Figure 2:
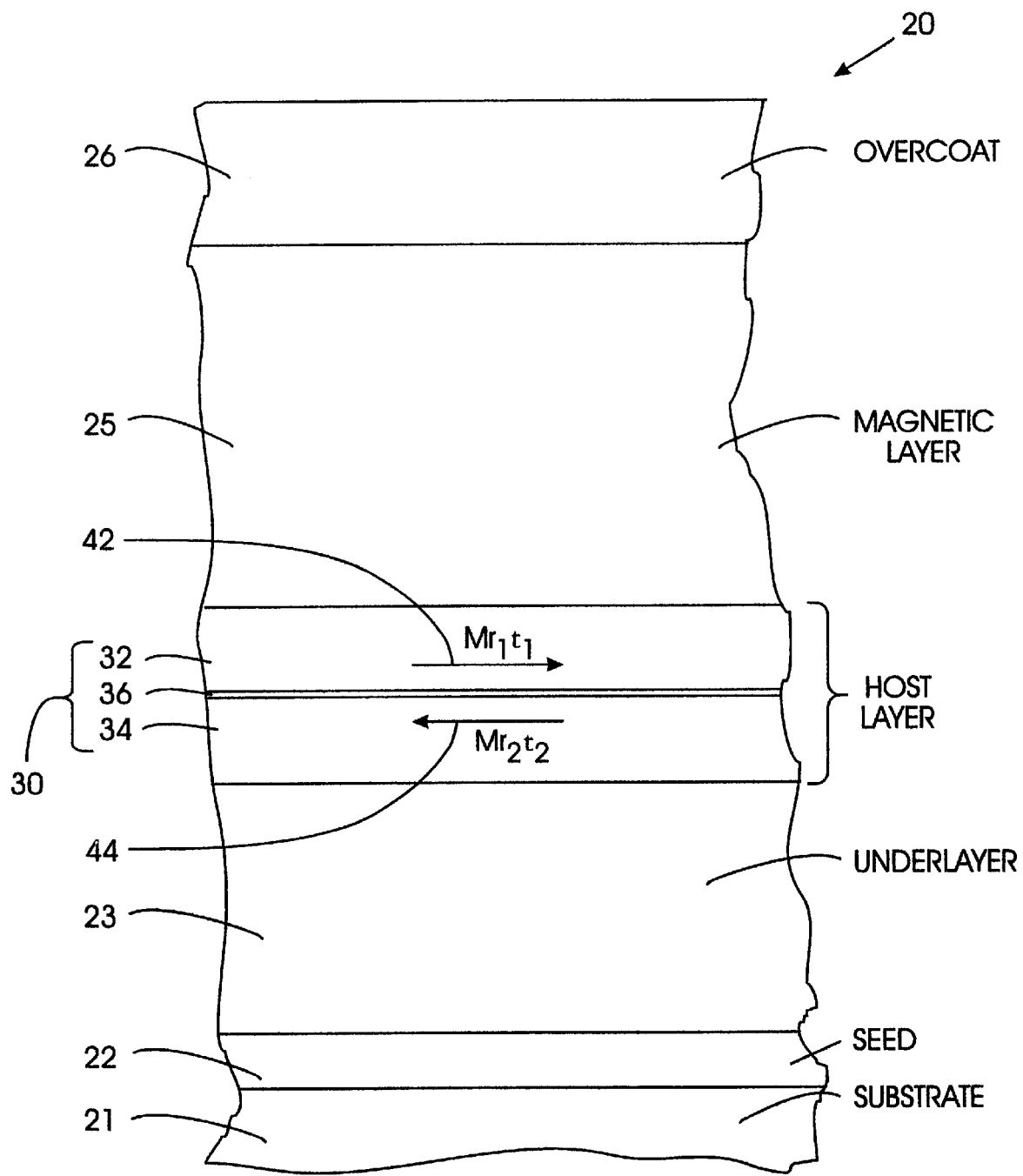
FIG. 2 is a schematic sectional view of a magnetic recording disk of the present invention illustrating the antiferromagnetically (AF) coupled host layer beneath the magnetic recording layer.

A magnetic recording disk 20 according to the present invention is depicted in the cross-section schematic shown in FIG. 2, wherein the host layer 30 has replaced the onset or nucleation layer 14 of the prior art structure of FIG. 1. As shown schematically in FIG. 2 the recording layer 25 is deposited on the host layer 30. Host layer 30 is made up of two ferromagnetic films 32, 34 separated by a nonferromagnetic spacer film 36. The nonferromagnetic spacer film 36 has a thickness and composition chosen so that the magnetic moments 42, 44 of adjacent films 32, 34, respectively, are AF-coupled through the nonferromagnetic spacer film 36 and are anti parallel in zero applied magnetic fields. The ferromagnetic films 32, 34 have magnetic moment values of $Mr_1t_1$ and $Mr_2t_2$, respectively, wherein $Mr_1t_1$ and $Mr_2t_2$ are approximately equal. (Because the remanent magnetization Mr is expressed as the magnetic moment per unit volume of ferromagnetic material, the product Mrt is the magnetic moment per unit area for a magnetic layer of thickness t).

In the preferred embodiment each of the ferromagnetic films 32, 34 has substantially the same thickness t and is made of substantially the same ferromagnetic material so as to have the same Mr. Thus the magnetic moments 42, 44 essentially compensate or cancel each other, so that the host layer 30 has substantially no net magnetic moment.

The AF coupling of ferromagnetic films via a nonferromagnetic transition metal spacer film has been extensively studied and described in the literature. In general, the exchange coupling oscillates from ferromagnetic to antiferromagnetic with increasing spacer film thickness. This oscillatory coupling relationship for selected material combinations is described by Parkin et al. in "Oscillations in Exchange Coupling and Magnetoresistance in Metallic Superlattice Structures: Co/Ru, Co/Cr and Fe/Cr", *Phys. Rev. Lett.*, Vol. 64, p. 2034 (1990). The material combinations include ferromagnetic films made of Co, Fe, Ni, and their alloys, such as Ni—Fe, Ni—Co, and Fe—Co, and nonferromagnetic spacer films such as ruthenium (Ru), chromium (Cr), rhodium (Rh), iridium (Ir), copper (Cu), and their alloys. For each such material combination, the oscillatory exchange coupling relationship has to be determined, if not already known, so that the thickness of the nonferromagnetic spacer film is selected to assure antiferromagnetic coupling between the two ferromagnetic films. The period of oscillation depends on the nonferromagnetic spacer material, but the strength and phase of the oscillatory coupling also depends on the ferromagnetic material and interfacial quality. The oscillatory antiferromagnetic coupling of ferromagnetic films has been used in spin-valve type giant magnetoresistance (GMR) recording heads to design continuous magnetized antiferromagnetically coupled films whose magnetic moments are rigidly coupled together anti parallel during operation of the head. These type of spin-valve structures are described, for example, in IBM U.S. Pat. Nos. 5,408,377 and 5,465,185. This type of magnetic structure of two ferromagnetic films antiferromagnetically coupled across a very thin nonferromagnetic spacer film, such as used in spin-valve heads and shown in the host layer 30 structure of FIG. 2, is also called a "synthetic antiferromagnet". In the case where the structure has no net magnetic moment because the moments from the individual ferromagnetic films cancel, the structure can be called a "compensated" synthetic antiferromagnet.

For this AF-coupled structure of host layer 30 the orientations of the magnetic moments 42, 44 of adjacent films 32, 34, respectively, are aligned anti parallel and thus add destructively. The arrows 42, 44 represent the moment orientations of individual magnetic domains that are directly above and below one another across the AF coupling film 36. In the absence of an applied magnetic field, the bottom ferromagnetic film 34 on underlayer 23 will have a granular structure with individual magnetic domains having their moments essentially randomly oriented in the plane of the film. The grains of ferromagnetic film 32 form magnetic domains with moment orientations that are anti parallel to the moment orientations of ferromagnetic film 34 that are directly across the AF coupling film 36.

The type of ferromagnetic material and the thickness values $t_1$, $t_2$ of the ferromagnetic films 32, 34 are chosen so that the net moment in zero applied field will be essentially zero. The Mrt for the host layer 30 is given by $Mr_1t_1-Mr_2t_2$. In the preferred embodiment, $Mr_1t_1$ should be equal to $Mr_2t_2$. This may be accomplished by using the same ferromagnetic materials in the two films 32, 34 and having $t_1$ be the same as $t_2$. If different ferromagnetic material compositions are used in the two films 32, 34 so that the magnetization (the magnetic moment per unit volume of material) of the two ferromagnetic films is made different, then the thicknesses are adjusted accordingly. While FIG. 2 is shown for a host layer 30 with two-film structure with a single spacer film, the invention is extendible to host layer structures with multiple spacer films and multiple ferromagnetic films.

The magnetic recording layer 25 is deposited directly on the top ferromagnetic film 32, which also acts as the onset or nucleation layer for the magnetic layer 25. Because the host layer 30 is intended to function as a compensated synthetic antiferromagnet, the composition of the magnetic layer 25 on top of film 32 must be different from the composition of film 32. In the preferred embodiment the magnetic layer 25 is a CoPtCrB alloy and the ferromagnetic films 32, 34 of host layer 30 are also a CoPtCrB alloy, but with a different composition, e.g. B is present in an amount significantly less than in the magnetic layer 25. Alternatively, films 32, 34 may be a CoCr alloy or a CoPtCr alloy. The films 32, 34 may have a thickness in the range of 0.5 to 5 nm. The nonferromagnetic spacer film 36 in host layer 30 is a 0.6 nm Ru film. The Ru spacer film thickness was chosen to be at the first antiferromagnetic peak in the oscillatory coupling relationship. It may also be desirable for each of the CoPtCrB ferromagnetic films 32, 34 to include an interface film consisting essentially of 0.5 nm of Co at the interface with the Ru spacer film 36. These ultra-thin Co films increase the interfacial moment between the ferromagnetic films and the spacer film, resulting in enhanced antiferromagnetic coupling. However, antiferromagnetic exchange coupling will occur without incorporating the Co interface films in the CoPtCrB ferromagnetic films 32, 34.

The top ferromagnetic film 32 is exchange coupled ferromagnetically to the magnetic layer 25 and weakly coupled antiferromagnetically to the bottom ferromagnetic film 34 across the spacer film 36. When the magnetic field from the write head switches the magnetization direction of grains in the magnetic layer 25, the magnetization direction of the top film 32 will also switch because of the exchange coupling with those grains. The magnetization direction of the bottom film 34 will also switch due to its weak antiferromagnetic coupling to top film 32. Thus the moments of films 32, 34 will remain anti parallel regardless of the magnetization direction of the grains in the magnetic layer 25 on top of the host layer 30.

The enhanced thermal stability of the preferred embodiment composite structure (magnetic layer 25 together with host layer 30) compared to a single magnetic layer arises because the anisotropy of the grains in both films 32 and 34 are substantially uniaxial, and thus can add constructively even if the magnetic moment 42, 44 of films 32, 34, respectively, are anti parallel. The magnetic volume V of the composite structure that determines the thermal stability will be approximately the sum of the volumes of the grains in the magnetic layer 25 and the AF-coupled films 32 and 34. However, the magnetic moment of the composite structure is just the moment from magnetic layer 25 because the host layer 30 has essentially no net magnetic moment. The antiferromagnetic coupling between the two ferromagnetic films 32, 34 provides a mechanism to increase the effective film thickness of the composite structure while reducing the net Mrt value of the composite structure. Thus the ferromagnetic films can contain very small diameter grains and maintain thermal stability.

In an alternative embodiment the two AF-coupled films of the host layer have magnetic moments that are still oriented anti parallel but are deliberately different in magnitude so that the host layer has a net non-zero magnetic moment ($Mr_1t_1$ not equal to $Mr_2t_2$). One reason for such an embodiment is that the optimum recording performance level of the structure may occur at a point where the thickness of the lower ferromagnetic film in the host layer is not equal to the thickness of the upper ferromagnetic film. If the same materials are used in both these films ($Mr_1=Mr_2$) then $Mr_1t_1$ is not equal to $Mr_2t_2$. This case may occur if it is necessary to keep the top film of the host layer thin enough that it does not generate recording noise for the magnetic recording layer, while it is necessary to make the bottom film of the host layer thick enough to more strongly develop the desired in-plane C-axis orientation. A second reason for the alternative embodiment relates to thermal stability of the media. A recorded magnetic transition in the media produces a magnetic field in a direction which tends to. demagnetize adjacent transitions, and thus facilitate thermal decay. In the host layer of the present invention, a transition will be created in the lower ferromagnetic film which will create a field which opposes this demagnetization field, and thus reduce thermal decay. A third reason for the alternative embodiment is to adjust the signal level or Mrt of the media. It is typical in the disk drive industry to design the disk according to requested values of Mrt and coercivity ($H_c$). However, Mrt and $H_c$ are correlated. Therefore, for a given Mrt value, to reach the Hc design point of the media the conventional approach is to change the process conditions, such as underlayer thickness or deposition temperature, which can be deleterious to the recording properties. With the present invention the Mrt can be adjusted through a different method, namely changing the relative values of $Mr_1t_1$ and $Mr_2t_2$.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetic recording disk comprising:

a substrate;

a nonferromagnetic underlayer on the substrate;

a host layer on the underlayer and comprising a first cobalt alloy ferromagnetic film having a thickness t1 and a magnetization M1, a nonferromagnetic spacer film of a material selected from the group consisting of ruthenium (Ru), chromium (Cr), rhodium (Rh), iridium (Ir), copper (Cu), and their alloys formed on and in contact with the first ferromagnetic film, and a second cobalt alloy ferromagnetic film formed on and in contact with the spacer film and having a thickness t2 and a magnetization M2, the spacer film having a thickness sufficient to induce the second ferromagnetic film to be exchange coupled antiferromagnetically to the first ferromagnetic film across the spacer film, and wherein the magnetic moments per unit area (M1×t1) and (M2×t2) of the first and second ferromagnetic films, respectively, are different from one another;

a magnetic recording layer on and in contact with the second ferromagnetic film of the host layer, the magnetic recording layer having a composition different from the composition of the second ferromagnetic film and being ferromagnetically coupled with the second ferromagnetic film; and a protective overcoat formed on the magnetic recording layer.

2. The disk of claim 1 wherein the first and second ferromagnetic films are formed of the same material, and wherein t1 is different from t2.

3. The disk of claim 1 wherein the first and second ferromagnetic films are formed of different materials and wherein t1 and t2 are substantially the same thickness.

4. The disk of claim 1 wherein the first ferromagnetic film of the host layer includes an interface film consisting essentially of cobalt and being in contact with the spacer film.

5. The disk of claim 1 wherein the second ferromagnetic film of the host layer includes an interface film consisting essentially of cobalt and being in contact with the spacer film.

* * * * *